United States Patent [19]

den Hollander et al.

[11] 4,153,493
[45] May 8, 1979

[54] CAPACITOR WINDING APPARATUS AND METHOD

[75] Inventors: Jacob den Hollander, Wayne, N.J.; Glenn D. Rayno, Fairfield, Conn.

[73] Assignee: Advance Transformer Company, Chicago, Ill.

[21] Appl. No.: 833,015

[22] Filed: Sep. 14, 1977

Related U.S. Application Data

[63] Continuation-in-part of Ser. No. 731,377, Oct. 12, 1976, abandoned.

[51] Int. Cl.² .............................................. B65C 9/04
[52] U.S. Cl. ................................. 156/188; 156/446; 156/458; 242/56.1
[58] Field of Search ................ 156/184, 185, 187–188, 156/190–191, 443, 446, 447, 457, 458, 494; 242/56.1, 67.1

[56] References Cited

U.S. PATENT DOCUMENTS

| | | | |
|---|---|---|---|
| 3,073,008 | 1/1963 | McGraw | 242/56.1 |
| 3,104,073 | 9/1963 | Post | 242/56.1 |
| 3,163,347 | 12/1964 | Ham et al. | 242/56.1 |
| 3,201,056 | 8/1965 | Fanning | 242/56.1 |
| 3,227,388 | 11/1966 | Masini | 242/56.1 X |
| 3,273,816 | 9/1966 | Fanning | 242/56.1 |
| 3,278,130 | 10/1966 | Jannett | 242/56.1 X |
| 3,367,594 | 2/1968 | Jannett | 242/56.1 |
| 3,425,641 | 9/1968 | Gallet | 242/56.1 |
| 3,432,901 | 3/1969 | Fanning | 242/56.1 X |
| 3,473,750 | 10/1969 | Batand | 242/56.1 |
| 3,540,099 | 10/1970 | Perrenoud | 242/56.1 X |
| 3,641,640 | 2/1972 | Rayburn | 242/56.1 |
| 3,689,002 | 9/1972 | Harvey et al. | 242/56.1 |
| 3,815,188 | 6/1974 | San Pietro | 242/56.1 X |

FOREIGN PATENT DOCUMENTS

| | | | |
|---|---|---|---|
| 644196 | 5/1960 | Canada | 242/56.1 |
| 669264 | 4/1952 | France | 242/56.1 |
| 1279766 | 11/1961 | France | 242/56.1 |

*Primary Examiner*—David A. Simmons
*Attorney, Agent, or Firm*—Silverman, Cass & Singer, Ltd.

[57] ABSTRACT

A capacitor winding machine includes a first core loading and winding position for winding a predetermined number of turns of two metallized films onto the core prior to moving the winding to a second finishing and ejecting position. Once the predetermined number of windings have been applied to the core in the first position, the winding is moved with the films under tension between the core and their respective supply rolls to the second position and the films are attached to and terminated from a second core which has then been loaded into the first loading position. The first core is then rotated to wind the free ends of the film onto the core which may then be heat or otherwise sealed to complete the metallized plastic film capacitor prior to being ejected from the machine.

59 Claims, 14 Drawing Figures

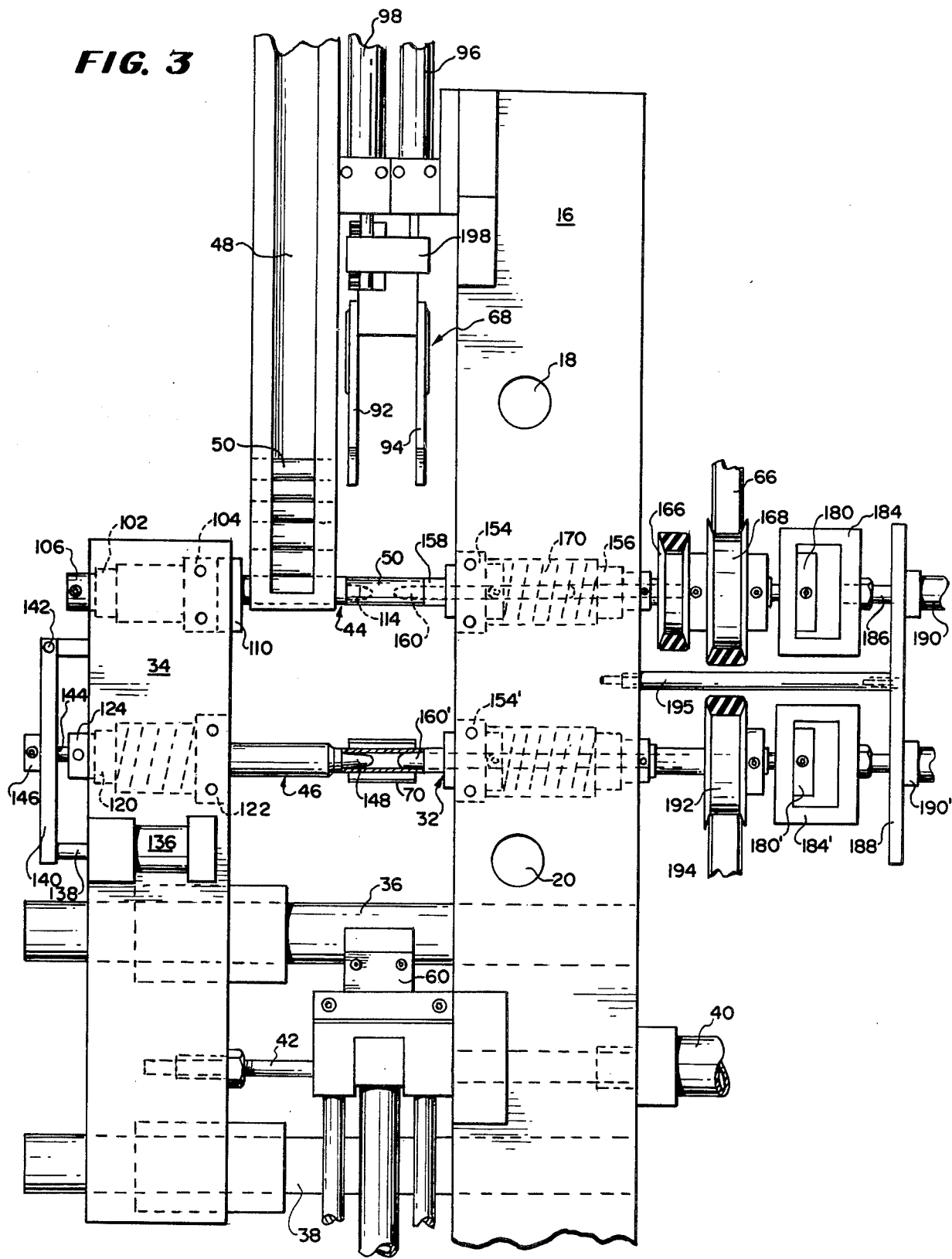

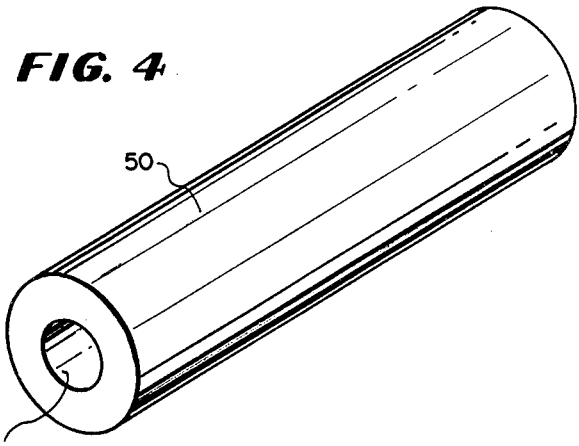
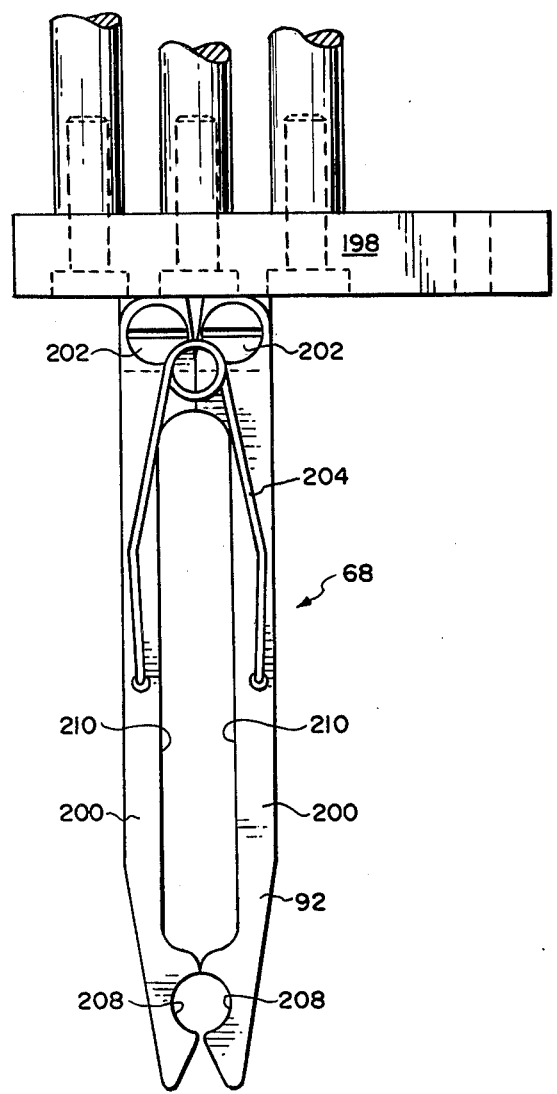
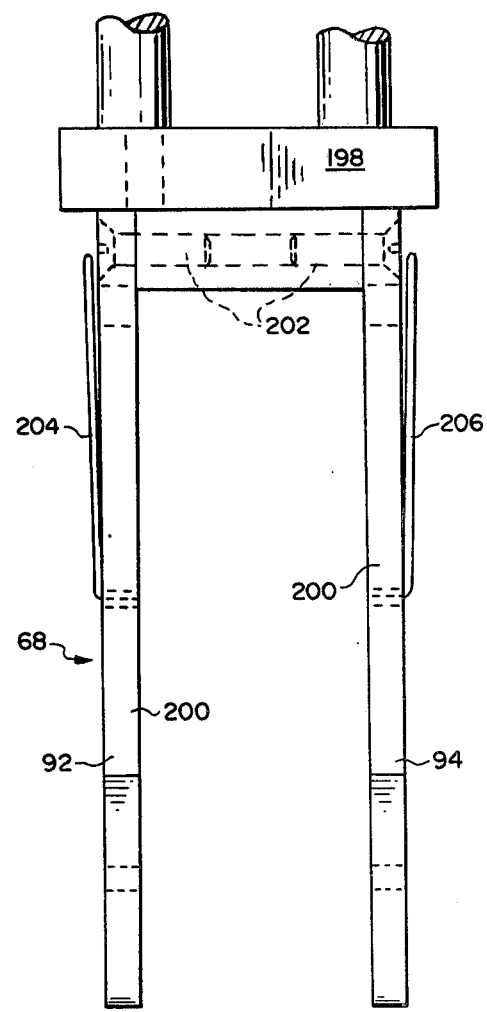

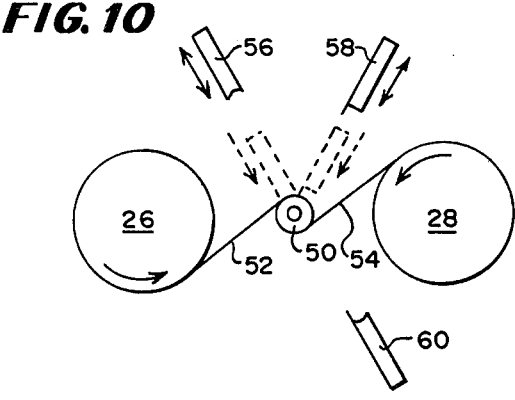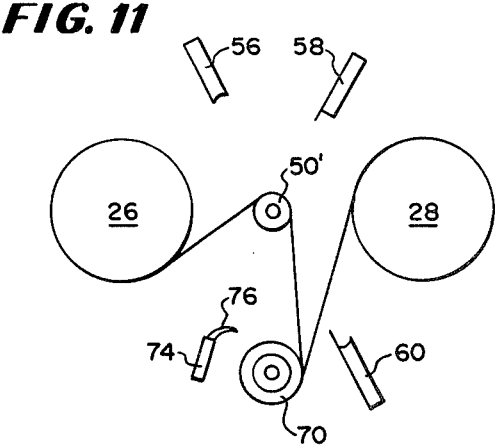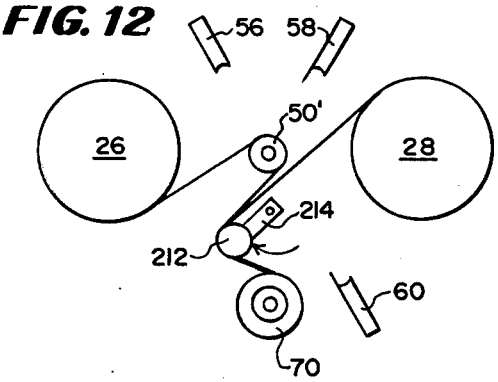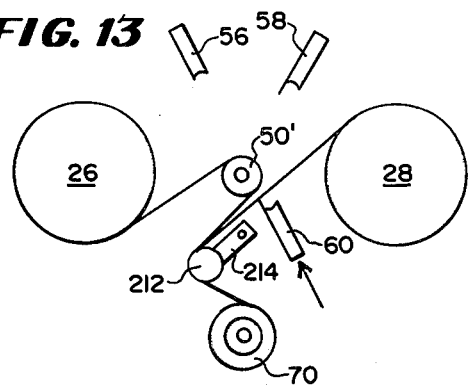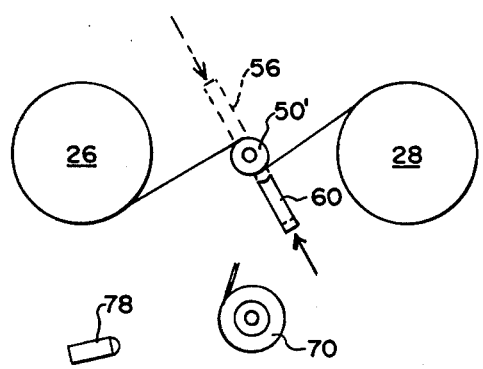

CAPACITOR WINDING APPARATUS AND METHOD

CROSS REFERENCE TO RELATED APPLICATION

This is a continuation-in-part of application Ser. No. 731,377 filed Oct. 12, 1976 entitled "CAPACITOR WINDING APPARATUS AND METRO ", now abandoned.

BACKGROUND OF THE INVENTION

The invention relates to a capacitor winding apparatus and method and more particularly to an apparatus and method of winding a dry metallized plastic film capacitor.

Capacitor winding machines, even those for winding a dry metallized plastic film capacitor, are well known in the art. Typically, two supply rolls of the metallized plastic film are mounted on separate spindles that are located at a remote distance from the drive means for a capacitor core. The plastic films travel over idlers and/or drive rollers and/or stationary surfaces before being wound onto the core to form the capacitor. These rollers and/or stationary surfaces are disadvantageous insofar as they can cause damaging scratches in the metallized plastic film surfaces which would result in a poor quality capacitor. In most machines, separate motors are used to drive each of the supply rolls and an additional motor is used to rotate the spindle on which the core is mounted. Since most of the metallized plastic films are extremely thin and hard to handle, means must be provided to maintain a constant tension on the supply of film to prevent misalignment of the winding. In the prior art devices, this has usually comprised a dancer roller which bears against the film, the dancer roller being connected to a potentiometer. A momentary increase or decrease in the film tension changes the position of the potentiometer and, consequently, adjusts the speed of the drive motors on the plastic film supply roll spindles.

Several machines currently available have the capability of winding capacitors on plastic cores which remain within the completed capacitor (known as the "lost core" process). These winding machines are all similar in design and consist of a complicated revolvable turret with three winding spindles located 120 degrees apart. In the first position, a plastic core is positioned on the spindle; in the second position, the winding is made; and, in the third position, the finished winding is removed from the apparatus.

All of these machines have elaborate mechanisms to cut, fold or otherwise separate the cut ends of the plastic films so as to stagger them at the beginning and the end of the winding. Alignment of the edges of the plastic film during the winding is accomplished by passing the plastic film over one or move idler rollers and the application of a constant tension to reduce the side slip or run out. In most of the prior art machines, adjustment and control of the run out or side slip is an extremely sensitive adjustment and results in a great deal of lost production time in setting up the apparatus and in readjusting the amount of run out to acceptable levels.

Many of the existing machines apply a pressure idler roll throughout the winding at or near the point of tangency where the two plastic films make contact with the core. This is an attempt to minimize the thin air layer on the plastic film that would normally enter the winding, by pinching the air from the film surface just before the wind-up occurs. However, with plastic films, such as polypropylene, that tend to adhere very tightly when positioned closely to each other, air will become trapped just before the plastic films reach the pressure roller. Because of the tenacity of this adhesion, only a portion of this trapped air can be excluded from the winding by the single pressure roller acting on the two layers of plastic film. This air film, should it enter the winding, would cause air voids in the completed capacitor in which corona discharges would occur, and would also provide sufficient lubrication to cause the film to side slip during the winding operation.

Control of the plastic film tension on all of the known winding machines is also aggravated during acceleration and deceleration of the winding because of the moment of inertia of the supply rolls, especially when new supply rolls are added. This problem has limited the diameter of the supply rolls to approximately ten inches on even the best of the controlled tension winding machines.

Typical prior art coil winding machines are disclosed in the following U.S. patents:

| | |
|---|---|
| 3,227,388 | Masini |
| 3,425,641 | Gallet et al |
| 3,473,750 | Bayard, Jr. |
| 3,540,099 | Perrenound |

Masini describes a coil winding machine wherein a foil is passed between spaced apart, pressure sensitive terminal tapes which, at intervals, are moved into contact with the opposite surfaces of the metal foil to adhere thereto over short distances. The metal foil to which the terminal tape has been applied is then would upon a core with a paper coil.

Gallet et al discloses an apparatus for winding capacitors utilizing metallized film supply rolls mounted on pivoted arms that are spring biased into tangential contact with the core, but no means are shown to move the supply rolls out of contact with the core. Bayard, Jr. is directed to an apparatus for winding capacitors utilizing metallized film supply rolls which feed the metallized film from each in superposed relation to a split arbor. There is also included means for interposing an insulating ribbon between the metallized films near the end of one winding and at the beginning of the next successive winding.

Perrenoud is directed to a machine for making electric condensers wherein a plurality (three) of core grippers are mounted on a turret which rotates each core gripper from one of three working positions to another. In a first working position, the core gripper releasably grips a core. In the second working position strips of material are wound onto the core. In the third working position, the strips of material are severed and a protective band is applied around the material wound on the core.

The following patents also illustrate typical prior art coil winding devices on individual features utilized thereon:

| | |
|---|---|
| 3,367,594 | 3,779,474 |
| 3,641,640 | 3,073,008 |
| 3,278,130 | 1,385,379 |
| 3,163,347 | 3,273,816 |
| 3,104,073 | 3,201,056 |
| 3,459,616 | British Pat. 669,264 |

| | |
|---|---|
| 3,815,188 | Canadian Pat. 644,196 |
| 3,689,002 | French Pat. 1,279,766 |

SUMMARY OF THE INVENTION

The above and other disadvantages of prior art capacitor winding devices and techniques are overcome in accordance with the present invention by providing a first core loading and winding position for winding two metallized plastic films around the core and a second position for finishing the winding and for ejecting the finished capacitor from the machine. Each of the metallized plastic films is disposed on a separate supply roll spaced from the first core loading and winding position and the machine includes means for maintaining the metallized films under tension between the supply rolls and the core being wound. In a preferred embodiment, the supply rolls are fixed and the tension is maintained on each supply roll as the core is moved from the first position to the second position prior to securing the two films to a second core which is loaded into the first position before the films are cut from the first core and the free ends sealed thereto. In a second embodiment, the supply rolls are moved into tangential contact with the core as it is being wound in the first position to enable the plastic film to be tightly wound on the core without entrapping air between the layers of the core. After winding the requisite number of turns onto the core, the supply rolls are withdrawn laterally with the films maintained under tension between the rolls and the wound core and then the operation proceeds in an identical manner as before. A feed finger mechanism grasps the core in the first position and moves it to a second position. The two films are then secured to a second core which has been loaded into the first position in a staggered relationship as before and then the ends of the film between the second core and the first core are cut and the first core is rotated to wind the free ends of the cut film onto the now finished and wound core which may then be heat sealed before it is ejected from the machine.

BRIEF DESCRIPTION OF THE DRAWINGS

FIG. 3 is an exploded side plan view of the capacitor winder illustrating the first and second core positions;

FIG. 4 is a perspective view of the capacitor core utilized in the capacitor winding machine;

FIG. 5 is a detailed front view of the feed finger assembly of the capacitor winding machine;

FIG. 6 is a side view of the feed finger assembly of FIG. 5;

FIGS. 10 through 14 are schematic diagrams of an operational sequence of the capacitor winding machine.

DESCRIPTION OF THE PREFERRED EMBODIMENTS

Figure 1:
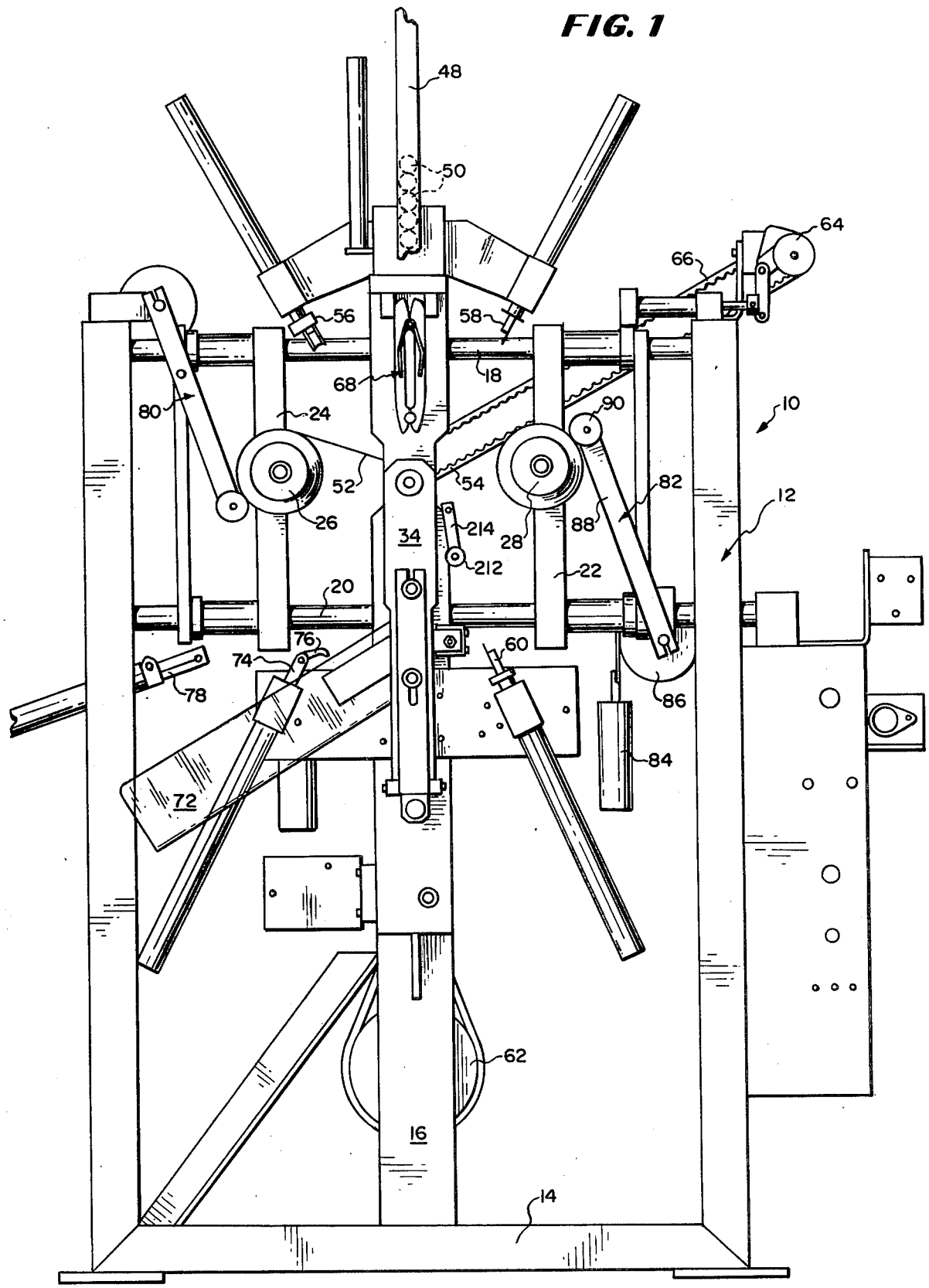
FIG. 1 is a side elevational view of the capacitor winder illustrating only the main components thereof.
Figure 2:
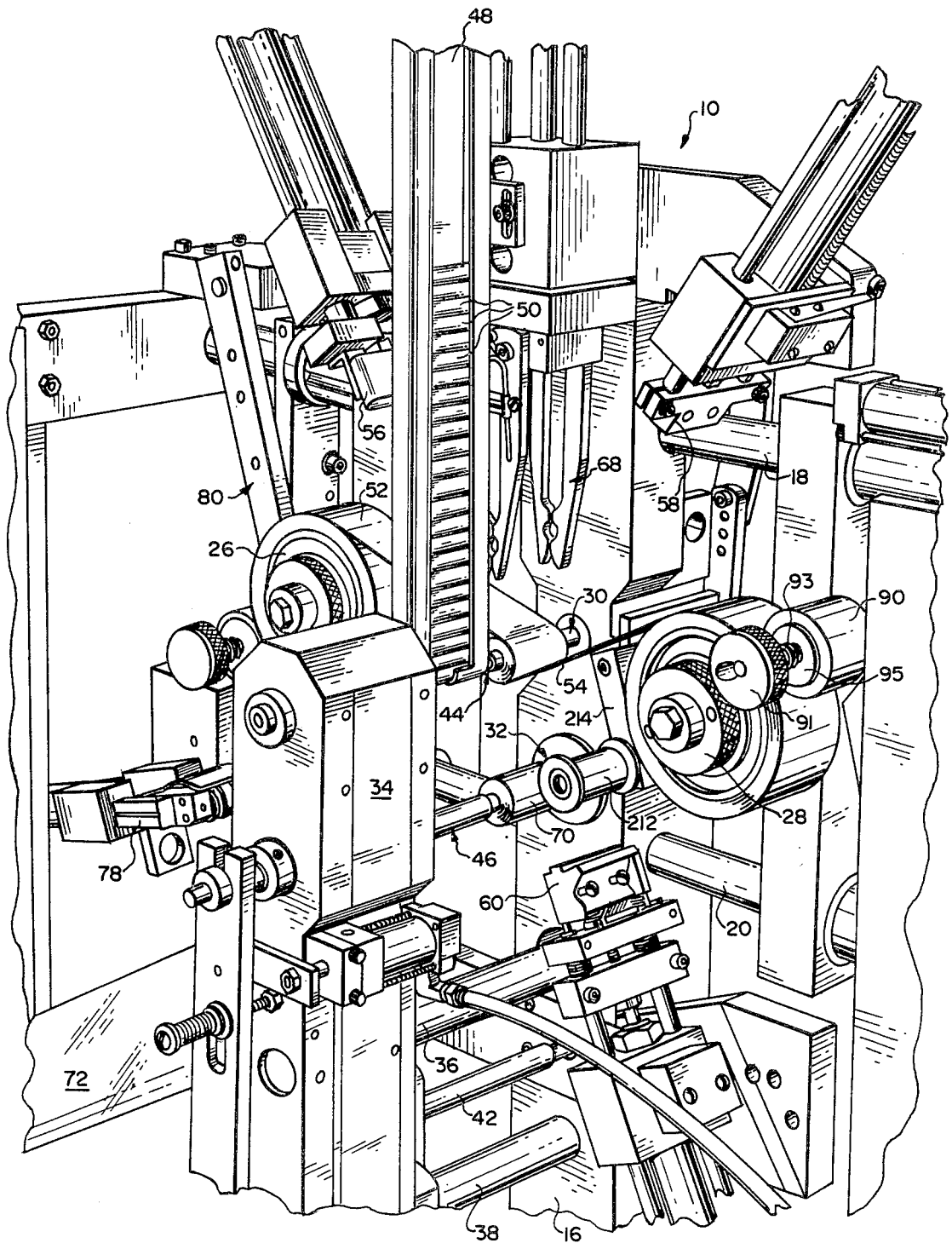
FIG. 2 is a partial perspective view of the capacitor winding machine.

Referring now to FIGS. 1 and 2, the capacitor winder of the invention is designated generally at 10 mounted on a suitable frame 12 including a base member 14. The particular shape of the frame 12 and base member 14 are not critical so long as the requisite rigidity and strength is provided for the capacitor winder 10.

A main vertical support member 16 includes a pair of support bars 18 and 20 extending laterally therefrom to the frame 12. The support bars 18 and 20 may be two separate members extending from each side of the support member 16 or preferably will be a single member extending from one side of the frame 12 through the support member 16 to the other side of the frame 12. The support bars include a pair of supply roll spindle assemblies 22 and 24 mounted on opposite sides of the support member 16. The spindle assembly 24 includes a first supply roll 26 mounted thereon aligned perpendicularly with the front surface of the main support member 16 with a second supply roll 28 mounted in a similar manner on the spindle assembly 22.

The support member 16 includes a first rotatably mounted spindle assembly 30 defining a first core location and a second rotatably mounted spindle assembly 32 defining a second core location. The first core location is the core loading and winding location while the second location is the core finishing and ejecting position.

A spindle carriage 34 is slidably mounted on a pair of carriage slides 36, 38 into a first winding and finishing position toward the main support member 16 and into a second loading and ejecting position away from the main support member 16. The carriage slides 36 and 38 extend into the main support member 16 and are substantially parallel with the spindle assemblies 30 and 32.

A pneumatic cylinder 40 (FIG. 3) is mounted on the support 16 and operatively engaged with a piston rod 42 which is connected at its opposite end to the spindle carriage 34 such that as the piston rod 42 of the cylinder 40 retracts it moves the spindle carriage 34 along the carriage slides 36 and 38 to the first position toward the support member 16. As the rod 42 is extended, it moves the spindle carriage 34 into the second core loading and capacitor ejecting position away from the support member 16.

The spindle carriage 34 includes a first spindle assembly 44 which has an axis aligned with the first rotatable spindle assembly 30. A second spindle assembly 46 is also mounted in the spindle carriage 34 and has an axis aligning with the second rotatable spindle assembly 32.

A core supply chute 48 supplies cores 50 to align with the first core position when the spindle carriage 34 is moved to the second core loading and ejecting position away from the support member 16.

When a core 50 is loaded into the first core position location, a metallized film 52 from the first supply roll 26 is placed on top of the core and a second metallized film 54 from the second supply roll 28 is secured to the bottom of the core. The particular locations of the affixing of the films to the core is not critical as long as they are in a staggered relationship one to the other so that they will not be shorted together when they ar heat sealed to the core.

The first metallized film 52 (see FIG. 2) is heat sealed to the top of the core 50 by a pneumatically actuated heat seal 56 which is pneumatically moved into engagement with the film 52 on top of the core. The loose end of the film 52 is then cut off by a pneumatically operated knife 58 which is actuated and brought into contact with the core 50 beyond the film connection. The second metallized film 54 is simultaneously heat sealed and cut off beyond the connection by a combined heat seal and knife 60 which is also pneumatically operated. A main motor 62 is then operated to rotate the spindle assembly 30 to wind the two films 52, 54 onto the core for a predetermined number of turns. A counter 64 is set for a predetermined number of turns and will count from the predetermined number down to zero to stop the motor 62. The counter 64 is operatively connected to the motor 62, as through a timing belt 66 coupled to the rotating spindle assembly 30.

Once the predetermined number of turns have been applied to the core, a feed finger assembly 68 is actuated to move down and grasp the exposed ends of the core 50 and to hold the core without rotating so that the metallized films 52,54 are maintained under tension between the wound core 50 and the supply rolls 26 and 28. A completed capacitor 70 is shown in FIG. 2 in the second position which will be ejected into a chute and collection bin 72 for further operations which will be described hereinafter. The feed finger assembly 68 then moves the wound core, with the films 52,54 still attached, into the second core position aligned with the spindles 32 and 46. The first film 52 must be lifted over the first position before a next core 50' is loaded. This is accomplished by a pneumatically or otherwise operated lifting arm 74 which pushes the film 52 over the top or first position above the spindles 30 and 44 and holds it while the next core 50' is loaded into the first position (see FIG. 1). The wound core 50 is then engaged by the spindles 32 and 46 and simultaneously the next core 50' is loaded into the first position on the spindles 30 and 44. The finger assembly 68 will then be retracted to its original position.

The lifting arm 74 includes a pivotable finger 76 which will pivot over the new core 50' as the lifting arm 74 is retracted. The two films 52,54 may now be heat sealed to the new core 50' in the uppermost position and cut as will be further described hereinafter. Afterwards the films are heat sealed to the finished core 50 in the second position as the wound core rotates on the spindles 32 and 46 by a rotating heat seal 78. Again the heat seal 78 is pneumatically or otherwise actuated to bring it into contact with the completed wound capacitor 70. The operation thus continues automatically throughout the number of capacitors desired to be made in a particular run or until the metallized film is exhausted from the two supply rolls 26 and 28 at which time the supply rolls are replaced with new supply rolls and the cycle is initiated again.

One of the most important aspects of the capacitor winder 10 involves maintaining the winding around the core 50 with a substantial amount of tension to eliminate looseness and possible air pockets. Preferably the tension is maintained between the supply rolls 26 and 28 and the core 50 while they are spaced from the core 50. To maintain a substantially constant tension on each of the supply rolls 26 and 28 a manually adjustable slip clutch 80 is adjusted to bear against the outer periphery of the supply roll 26 and an inverted but substantially identical slip clutch 82 is positioned to bear against the outer periphery of the supply roll 28. The operation of each of the slip clutches is identical so that only the slip clutch 82 will be described in detail.

The slip clutch 82 includes a weight 84 attached around a disc 86 which has an arm 88 affixed thereto with a teflon cylinder 90 onthe end thereof. The axis of the teflon cylinder 90 and the arm 88 prescribe an arc through the center of the supply roll 28. The cylinder 90 is adjustable with a manual tension screw 91 bearing against a spring 93 which bears against a pair of discs 95 (only one shown) on either side of the cylinder 90 in a conventional slip clutch design. The screw 91 is adjusted for the desired tension to be applied to the supply roll.

Each of the supply rolls 26 and 28 is also connected on the rearward side (not seen) to a shaft having a fixed disc on the end thereof. The disc is spaced opposite an electromagnetic clutch fixed on the shaft of a high ratio low rpm gear tension motor. In operation, the tension supplied by the slip clutches 80 and 82 is substantially constant and after some predetermined number of turns, the electromagnetic clutch is engaged to increase the tension. The electromagnetic clutch is not turned on at the first of the winding to prevent the center of the windings having all the tension concentrated on them. The clutch may have a varied number of steps or may be variable throughout and controlled from the counter 64. When the winding motor 62 has stopped, the gear tension motor is reversed which cooperates through the electromagnetic clutch to keep the films 52,54 under tension between the wound core 50 and the supply rolls 26,28.

Alternately, the supply rolls 26,28 are moved laterally on the spindles 22,24 on the support bars 18,20 into tangential contact with the core 50 as it is being wound. The spindles 22,24 may be moved by hydraulic cylinders attached to the frame 12 or the support member 16 or by other conventional means. The proper tension of the supply rolls and films may again be provided with the slip clutches 80 and 82 and by the electromagnetic clutches coupled to the supply rolls as before.

Further details of the operation of the spindle carriage 34, the spindles, and the feed finger assembly 68 are best illustrated in FIG. 3. In FIG. 3 it can be seen that the feed finger assembly 68 includes a front pair and rear pair of fingers 92 and 94 respectively to grasp the outer ends of the core 50 without disturbing the completed winding 70. Again, the finger assembly 68 is preferably pneumatically actuated with a first cylinder 96 operable to move the finger assembly 68 to the first position and a second cylinder 98 operable to move finger assembly 68 to the second lower position.

The spindle assembly 44 of the spindle carriage 34 loads the lowermost core 50 into the first position as the core 50 moves to the bottom of the core supply chute 48. The body of the spindle 44 extends through the bottom of the chute 48 and prevents the next core from occupying the bottom position of the chute 48 until the spindle carriage 34 and the spindle 44 are moved to the second load position.

Figure 9:
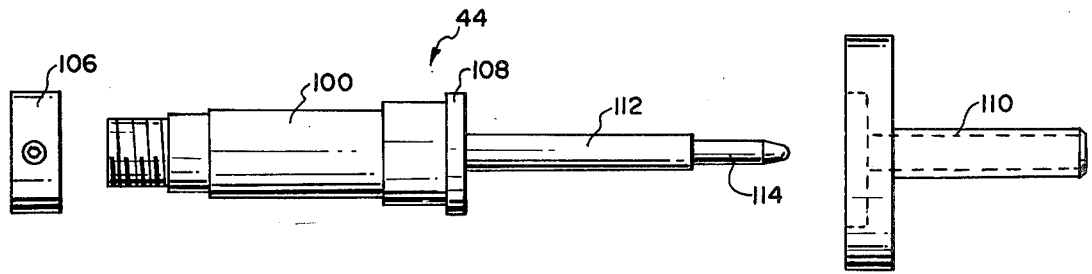
FIG. 9 is an exploded side view of the first core position spindle assembly of the spindle carriage.

The spindle assembly 44 is shown in detail in FIG. 9. The assembly 44 includes an inner spindle 100 rotatably mounted to the spindle carriage 34 by a pair of bearings 102 and 104. The bearings may be plain, or of the roller type, so as to allow the rotation of the inner spindle 100 with respect to the spindle carriage 34. A retaining nut 106 is threadedly engaged to one end of the inner spindle 100 such that as the nut 106 is tightened and bears against one surface of the bearing 102, it brings a radially protruding flange 108 of the inner spindle 100 against one surface of the bearing 104 to retain the inner spindle 100 in its position. An outer stationary spindle 110 is fixedly attached to the spindle carriage 34 and surrounds an extending portion 112 of the inner rotating spindle 150. The extending portion 112 includes a reduced diameter end 114 which engages within the hollow portion of each of the cores 50 which causes the inner spindle 100 to rotate therewith when the core is rotated by the first rotatable spindle assembly 30. The extending portion 112 of the spindle assembly 34 is of a diameter at least as great as the inner diameter of the opening through the core 50, such that as the spindle carriage 34 moves toward the support member 16, the extending portion 112 contacts one end of the lowermost core in the supply chute 48 and pushes it out of the chute 48 and onto the end of the spindle assembly 30.

Figure 7:
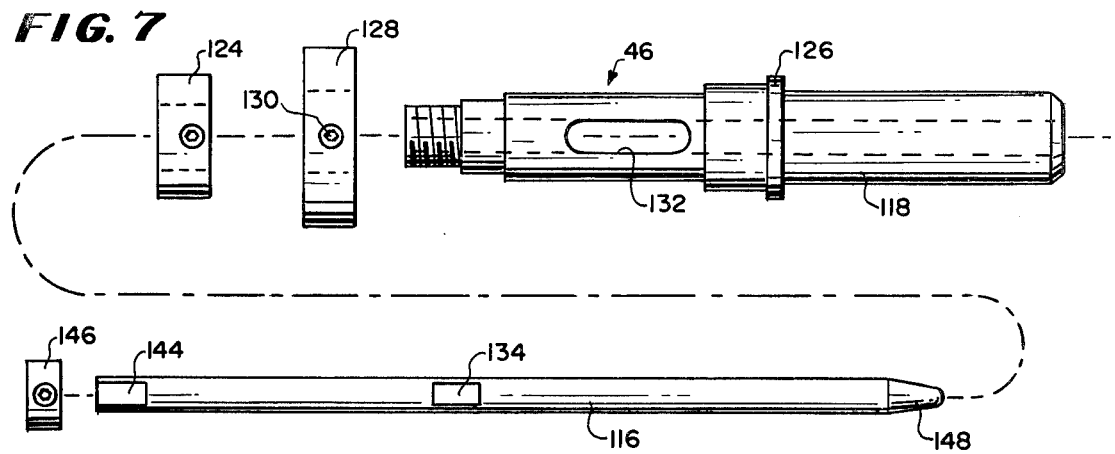
FIG. 7 is an exploded side view of the second core position spindle assembly of the spindle carriage.

The spindle assembly 46 is illustrated in FIG. 3 and is shown in detail in FIG. 7. The spindle assembly 46 includes an inner spindle 116 mounted within an outer spindle 118 so as to rotate therewith and move longitudinally with respect thereto. The outer cylinder 118 is rotatably supported in the spindle carriage 34 by a pair of bearings 120 and 122. A retaining nut 124 threadingly engages the outer spindle 118 and as it is tightened bears against bearing 120 drawing a radially extending flange 126 against the bearing 122 to thereby retain the spindle assembly 46 in the spindle carriage 34. A collar 128 slides over the outer spindle 118 and is attached to the inner spindle 116 by radially inwardly set screws 130, (only one of which is shown) which extend through a pair of slots 132 (only one of which is shown) through the outer spindle 118 to bear against a pair of flat portions 134 (only one of which is shown) on the inner spindle 116 located 180° apart.

A pneumatic cylinder 136 is connected to the spindle carriage 34 and has a piston rod 138 attached to one end of a reject plate or rod 140 which has its opposite end pivotally attached at a pivot point 142 to the carriage 34. The outer end 144 of the inner spindle 116 extends through the reject plate 140 and is secured thereto by a collar 146 secured to the end 144 of the spindle 116. The extension and retraction of the piston rod 138 will thereby move the inner spindle 116 with respect to the outer cylinder 118 to eject the completed windings 70 from the opposite end 148 of the inner spindle 116 as it draws them against the outer cylinder 118.

Figure 8:
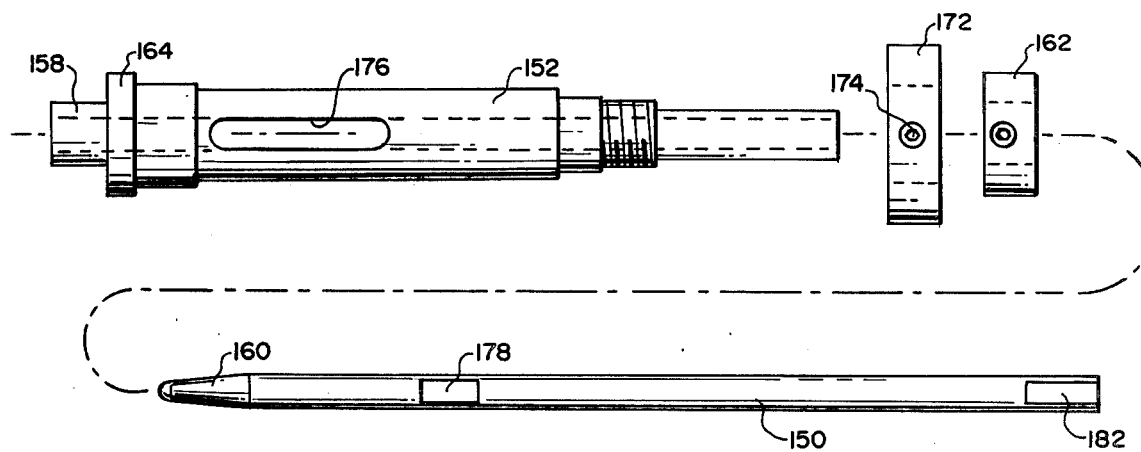
FIG. 8 is an exploded side view of the first core position spindle assembly.

The spindle assembly 30 is illustrated in FIG. 3 and in detail in FIG. 8. The spindle assembly 30 includes an inner spindle 150 which is slidably, but not relatively rotatably, mounted within an outer spindle 152. The outer spindle 152 is rotatably retained in the support member 16 by means of a pair of bearings 154 and 156. These bearings may be of any standard and convenient commercial type. The outer spindle 152 has a longitudinally extending shoulder 158 which is of a diameter at least as great as the inner diameter of the core 50 such that as the inner spindle 150 is retracted, the shoulder 158 will bear against the end of the core 50 to force it off the inner spindle 150 and not off the spindle 44. The end 160 of the inner spindle 150 which engages the interior surface of the core 50 is tapered with a polygon cross-section shape to give a positive rotating effect when inserted into the cores 50.

The outer spindle 152 is retained within its bearing mounting by a lock nut 162 which is threadingly engaged with the outer surface of the outer spindle and bears against one side of the bearing 156. As the nut 162 is tightened, it draws a radially extending shoulder 164 into contact with the bearing 154 to thereby retain the outer spindle 152 within the support member 16. A pulley 166 is also attached to the outer spindle 152 so as to impart rotational motion thereto when driven by the motor 62 by way of a V-belt or other transmission link (not shown). A second pulley 168 is also attached to the outer spindle 152 which engages the timing belt 66 to drive the counter 64.

The inner spindle 150 is urged toward its extended position (to the left in FIG. 3 into the core 50) by way of a spring 170 which bears against the bearing 156 and a sliding collar 172 which is slidably mounted about the outer spindle 152. A pair of set screws 174 (only one of which is shown) are threadably engaged in the collar 172 and extend radially inward therefrom to pass through a pair of slots 176 (only one of which is shown) in the outer spindle 152. The inner ends of the screws 174 are extended against a pair of flat portions 178 (one of which is shown) located 180° apart on the inner spindle 150.

A retracting collar 180 is fixedly attached to a second end 182 of the inner spindle 150 on the interior of a connecting member 184. The connecting member 184 is attached to a piston rod 186 through a fixed plate 188 to a pneumatic cylinder 190. When the pneumatic cylinder 190 is actuated the piston rod 186 will withdraw the connecting member 184 and hence the retracting collar 180 and the inner spindle 150 releasing the core 50 from the end 160 of the inner spindle 150. The force generated by the retraction of the piston rod 186 overcomes the force of the spring 170 sufficiently to cause the inner spindle 150 to move longitudinally with respect to the outer cylinder 152. When the cylinder 190 is not actuated, the piston rod 186 will be free to return the inner spindle 150 to its extended position by the action of the spring exerting the force on the collar 172.

The spindle assembly 32 is substantially identical in construction to the spindle assembly 30 just described with the exception that a separate motor drive pulley 192 is connected to the motor 62 by way of a drive belt 194 and there is no connection to the counter 64. The parts of the spindle assembly 32 which are identical in operation to the parts of the spindle assembly 30 will be described when necessary utilizing the same numerals with a prime to indicate they are of the spindle assembly 32. The pneumatic cylinder 190' is also connected to the fixed plate 188 which may be mounted to the support member 16 by a plurality of rods 195 (only one of which is shown).

The core 50 which has already substantially been described is best illustrated in FIG. 4. The core preferably has a generally cylindrical shape with an opening 196 through the center thereof so that it easily may be mounted on the pairs of spindles 30, 44 and 32, 46. The cross-section of the core opening 196 may be circular or may be in the shape of a polygon to bear against the tapered portion 160 of the spindles 30 and 32 to provide a positive drive to the cores 50 during the winding operations. The cores will preferably be of a dielectric material since they are retained within the finished capacitor 70 and should not interfere with the electrical properties of the capacitor itself.

The feed finger assembly 68 is illustrated in FIGS. 1 through 3 and in detail in FIGS. 5 and 6. The assembly 68 moves the wound core 70 from the first or winding position defined by the axis of the spindle assemblies 30 and 44 to the second rejecting position defined by the axis of the spindle assemblies 32 and 46. The feed finger assembly 68 is attached to the upper portion of the vertical support member 16. The assembly 68 includes a finger support block 198 to which are pivotally attached the front and rear pair of fingers 92 and 94. Each of the individual fingers 200 is pivotally attached to the support rod 198 by screws 202 at one end such that the distal ends of the fingers 200 may move toward and away from each other. Springs 204, 206 are respectively attached to the front and rear pairs of arms 92 and 94 such that the springs exert a force on the fingers 200 which tends to maintain the distal ends in close proximity to one another. Each of the distal ends of the fingers 200 has a semi-circular cutout 208 therein such that when the distal ends of the fingers 200 are in close proximity with one another the cutouts 208 define a generally circular opening. The opening defined by the cutouts 208 is dimensioned so that it will grip the outer periphery of the edges of the core 50 as previously described. The inner surfaces of the cutouts 208 may have teeth or other protrusions to ensure that the core 60 is firmly and nonrotatably attached and so that the tension will be maintained between the films and the core. The inner portion of each arm 200 includes a long longitudinal cutout 210 defining an elongate opening of a width greater than the diameter of the cores 50. The length of the arms 200 and the elongate opening are such that the new cores in the first position may be loaded through the elongate opening while the previously wound core is still grasped in the lower opening defined by the cutouts 208.

The operational sequence of winding a core 50 to form the finished capacitor 70 while simultaneously starting another winding will now be described utilizing the schematic FIGS. 10 through 14.

Looking at FIG. 10, a core 50 is loaded into the first position and has the free end of the first metallized film 52 placed on top thereof. Heat seal 56 is then actuated to move against the film 52 on the core 50 to attach the film to the core 50. Once the heat sealing is completed, the knife 58 will be actuated to trim any excess free end of the film 52 from the core 50. The second film 54 will be placed below the core 50 and the heat seal and knife 60 will be actuated to simultaneously heat seal the film 54 to the bottom of the core 50 and to trim off the excess of the film 54 extending beyond the core 50. The spindle assembly 30 is then rotated a sufficient number of turns until the counter 64 counts out. The assembly 30 then will stop rotating and the films 52 and 54 will be drawn tight between the supply rolls and the core 50. The finger assembly 68 then will come into engagement with the ends of the core 50 to grip the core to prevent loosening of the winding. The spindle 30 and then the spindle 44 will retract. The spindle 44 is retracted by the carriage 34 moving away from the support 16. When the spindle 44 has cleared the supply chute 48, a new core 50 will drop into position to next be loaded. The pneumatic cylinder 136 will be actuated to retract the spindle end 148 of the spindle 46 to eject the completed winding from the second position. In the first instance there will, of course, be no winding to eject.

The second cylinder 98 will be actuated to drive the finger assembly 68 and the wound core 70 to the second position as in FIG. 11. The lifting arm 74 will then lift the film 52 above the first position with its pivotable finger 76. The spindle carriage 34 will then move to its loading position to load a new core 50' into the first position through the finger pairs 92 and 94 and to secure the completed winding 70 onto the lower spindles 32 and 46. The lifting arm 74 and the finger assembly 68 will then retract to their original positions.

Next a spool 212 mounted on a pivot arm 214 will be actuated to pivot the spool 212 against the two films 52,54, to bring the films into intimate contact with one another. Once the two films are in intimate contact the heat seal 56 will again be operated to heat seal the film 52 against the new core 50' and the knife 58 will again be actuated cutting the film 52 loose from the previous winding 70. The knife 60 could then be operated to cut the film 54 fairly close to the end of the film 52 and a separate wrapper could be added to seal the film or it could be taped or otherwise sealed.

It is preferable; however, and most efficient within the confines of the capacitor winder 10 to rotate the assembly 32 and the completed core 70 several times to pull the cut film 52 from the new core 50' and to provide several turns of the film 54 around the completed winding 70. The heat seal and knife 60 may then be operated to heat seal the film 54 automatically to the bottom of the core 50' which has not yet been rotated. This results in the new core 50' being ready to be wound with both the films 52 and 54 attached and the previous winding 70 may now be completed by again rotating the spindle assembly 32 and engaging the rotating heat seal 78 against the outer periphery of the winding 70 sealing the last several turns of the film 54 to itself and completing the capacitor winding. The counter 64 in the meantime has been reset which will cause the winding motor 62 to again start the next cycle on the core 50' while the finished winding 70 will sit on the spindles 32 and 46 awaiting the next reject cycle after the core 50' has been wound.

At this point the winding 70 is completed ready to be end sprayed by a metal spray (shooped) and the contacts applied in a conventional manner and/or the capacitor may be heat set or heat treated prior to the end spraying if desired.

Many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. An apparatus for winding at least one strip of metallized plastic film from a supply roll around a hollow core to form a metallized plastic film capacitor comprising:
 (a) support means;
 (b) core supply means attached to said support means;
 (c) first coaxial rotatable spindle means attached to said support means to engage the core so as to rotate said core in a first position;
 (d) second coaxial rotatable spindle means attached to said support means to engage the core as to rotate said core in a second position;
 (e) at least one supply roll carriage means attached to said support means, said carriage means being movable along a linear path to bring the supply roll mounted thereon into and out of tangential contact with the core when it is in the first position;
 (f) means to move said at least one carriage along a linear path of travel;
 (g) tension means to maintain a predetermined tension in the plastic film between the supply roll and the core during the linear travel of the at least one carriage means;

(h) feed finger means to grip the core in the first position after the plastic film has been wound thereon and move it along a linear path to the second position;

(i) first attaching means to attach an end of the at least one strip of plastic film to the core when it is in the first position;

(j) second attaching means to sever the at least one strip of plastic material from a wound core placed in the second position and attach it to a core placed in the first position, and;

(k) driving means to rotate the first and second coaxial rotatable spindle means.

2. The apparatus of claim 1 wherein said first coaxial rotatable spindle means are disposed vertically above said second coaxial rotatable spindle means.

3. The apparatus of claim 2 further comprising two supply roll carriage means attached to said support means, disposed laterally on either side of the first coaxial rotatable spindle means, each carriage means being movable along a linear path to bring its respective supply roll into and out of tangential contact with the core when it is in the first position.

4. The apparatus of claim 3 wherein the two supply roll carriage means each comprise:
(a) a pair of slides attached to said support means such that they extend laterally therefrom, the pair of slides being vertically disposed with respect to each other;
(b) a carriage slidably attached to said pair of slides;
(c) means to removably and rotatably attach a supply roll of plastic film to said carriage, and;
(d) means to move the carriage along the slides.

5. The apparatus of claim 4 wherein the means to move each carriage along its slides comprises a cylinder assembly having an extensible rod attached such that extension and retraction of the rod causes movement of the carriage.

6. The apparatus of claim 5 wherein the cylinder assembly is pneumatically actuated.

7. The apparatus of claim 4 further comprising an end plate attached to the distal ends of each of the pair of slides.

8. The apparatus of claim 7 wherein the tension means comprises:
(a) a first pulley rotatably attached to the carriage so as to rotate with the supply roll attached thereto;
(b) a second pulley rotatably attached to the end plate;
(c) an elongated flexible member having one end attached to the end plate and passing partially around said first pulley and then said second pulley, and;
(d) a weight attached to the free end of said elongated flexible member.

9. The apparatus of claim 8 further comprising brake means which, when actuated, bears against the first pulley and the elongated flexible member to prevent rotation of the first pulley and the supply roll.

10. The apparatus of claim 8 further comprising;
(a) a digital counter having a predetermined value set therein;
(b) first means connecting said digital counter to a control circuit of the apparatus;
(c) second means connecting the driving means which rotates the first coaxial rotatable spindle means such that as said spindle rotates, the value of the digital counter decreases to zero and, upon reaching zero, said timer shuts off the driving means, and;
(d) third means connecting said counter with one of the carriages such that as said carriage moves away from the support means, the digital counter is reset to its original predetermined value.

11. The apparatus of claim 2 wherein said feed finger means comprises;
(a) a mounting block attached to an upper portion of the support means, said mounting block having a plurality of vertical holes therethrough;
(b) a support block having a plurality of vertically extending guide rods extending therefrom and passing through the holes in said mounting block;
(c) a plurality of pairs of fingers attached to said support block, each finger having one end pivotably attached to the support block and having a general semicircular cut out adjacent their distal ends to grip the core;
(d) spring means to bias the distal ends of the pairs of fingers toward each other, and;
(e) moving means to move the support block downwardly such that the fingers grip the core and move it from the first position to the second position, and subsequently retracting the support block to its original position.

12. The apparatus of claim 11 wherein the moving means is a pneumatically operated cylinder assembly having an extensible and retractable piston rod connected to said support block.

13. The apparatus of claim 2 wherein a first driving means rotates said first coaxial rotatable spindle means and a second driving means rotates said second coaxial rotatable spindle means.

14. The apparatus of claim 13 wherein said first driving means comprises;
(a) an electric motor having a rotatable output shaft;
(b) a first pulley attached to said output shaft so as to rotate therewith;
(c) a second pulley attached to said first coaxial rotatable spindle means so as to rotate therewith, and;
(d) drive belt means connecting said first and second pulleys such that rotation of the output shaft causes rotation of the spindle means.

15. The apparatus of claim 14 wherein said second driving means comprises;
(a) a second electric motor having a rotatable output shaft;
(b) a third pulley attached to said output shaft so as to rotate therewith;
(c) a fourth pulley attached to the second coaxial rotatable spindle means so as to rotate therewith, and;
(d) second drive belt means connecting said third and fourth pulleys.

16. The apparatus of claim 2 wherein said first coaxial rotatable spindle means comprises;
(a) a first spindle assembly, and;
(b) a second spindle assembly coaxially aligned with said first spindle assembly.

17. The apparaus of claim 16 wherein said first spindle assembly comprises;
(a) an outer spindle rotatably attached to the support means;
(b) an inner spindle mounted coaxially within said outer spindle so as to rotate therewith and so as to be movable with respect thereto along its longitudinal axis from an extended position to a retracted position and return, and;

(c) means to selectively move said inner spindle between its extended and retracted positions.

18. The apparatus of claim 16 wherein said second coaxial rotatable spindle means comprises;
(a) a third spindle assembly, and;
(b) a fourth spindle assembly coaxially aligned with said third spindle assembly.

19. The apparatus of claim 18 wherein said spindle assembly comprises:
(a) an outer spindle rotatably attached to the support means;
(b) an inner spindle mounted coaxially within said outer spindle so as to rotate therewith and so as to be movable with respect thereto along its longitudinal axis from an extended position to a retracted position and return, and;
(c) means to selectively move said inner spindle between its extended and retracted positions.

20. The apparatus of claim 18 further comprising:
(a) spindle carriage slide means attached to said support means;
(b) a spindle carriage slidably mounted on said spindle carriage slide means so as to move in a linear path parallel to the axis of said coaxial rotatable spindle means, said spindle carriage having said second and fourth spindle assemblies rotatably attached thereto, and;
(c) means to move said spindle carriage along its linear path of travel.

21. The apparatus of claim 20 wherein said fourth spindle assembly comprises:
(a) an outer spindle rotatably attached to said spindle carriage;
(b) an inner spindle mounted coaxially within said outer spindle so as to rotate therewith and so as to be movable with respect thereto along its longitudinal axis between an extended position and a retracted position and return, and;
(c) means to selectively move said inner spindle between its extended and retracted positions.

22. The apparatus of claim 20 wherein said third spindle assembly comprises:
(a) an inner spindle rotatably attached to the spindle carriage, said inner spindle having an extending portion extending from said carriage in a direction along its longitudinal axis, and;
(b) an outer spindle fixedly attached to said carriage and concentric with said extending portion.

23. The apparatus of claim 17 wherein said inner spindle is spring biased toward its extended portion.

24. The apparatus of claim 23 wherein said means to selectively move said inner spindle is a phenumatically actuated cylinder having a piston rod attached to the inner spindle.

25. The apparatus of claim 19 wherein said inner spindle is spring biased toward its extended position.

26. The apparatus of claim 25 wherein said means to selectively move said inner spindle is a pneumatically actuated cylinder having a piston rod attached to the inner spindle.

27. The apparatus of claim 20 wherein said means to move the spindle carriage comprises;
(a) a pneumatically actuated cylinder attached to said support means;
(b) a piston movable mounted within said cylinder, and;
(c) a piston rod having one end attached to the movable piston and the other end attached to the spindle carriage.

28. The apparatus of claim 21 wherein said means to selectively move said inner spindle between its extended and retracted positions comprises;
(a) a pneumatically actuated cylinder attached to the spindle carriage, said cylinder having a linearly movable piston rod extending from one end thereof;
(b) a rod having one end pivotally attached to the spindle carriage and the other end pivotally attached to the piston rod, and;
(c) means connecting the central portion of the rod to the inner spindle such that extension and retraction of the piston rod causes said inner spindle to move along its longitudinal axis.

29. The apparatus of claim 1 further comprising wrapper means to apply an outer wrapper to the wound capacitor.

30. The apparatus of claim 29 wherein said wrapper means comprises;
(a) wrapper carriage slide means attached to said support means;
(b) wrapper guide attached to said wrapper carriage so as to move therewith;
(c) attachment means to rotatably attach a supply roll of wrapper material to the wrapper carriage such that the wrapper material passes through said wrapper guide with a free end of such wrapper material extending beyond the end of the wrapper guide, and;
(d) means to move the wrapper carriage between a lower position and an upper position wherein the free end of the wrapper material is adjacent a core in the first position.

31. The apparatus of claim 30 further comprising brake means attached to the wrapper carriage to selectively prevent rotation of the wrapper supply roll.

32. The apparatus of claim 30 wherein the means to move the wrapper carriage comprises a pneumatically actuated cylinder attached to said support means, said cylinder having a movable piston rod extending therefrom said rod being connected to said wrapper carriage.

33. A method of winding a dry metallized plastic film capacitor comprising the steps of:
(a) attaching the ends of two plastic films from two supply rolls to a first core in a staggered relationship;
(b) moving the supply rolls into tangential contact with the first core;
(c) rotating the first core in a first position to wind a predetermined number of layers of plastic film thereon;
(d) retracting the supply rolls out of contact with the first core;
(e) moving the wound first core to a second position;
(f) inserting a second unwound core into said first position;
(g) attaching the two films to the second core in a staggered relationship and severing the film connecting the first and second core; and
(h) sealing the free ends of the film to the first, wound core.

34. The method of claim 33 wherein the attachment of the free ends of the plastic films to the first core is by heat sealing.

35. The method of claim 33 wherein the attachment of the plastic films to the second core is by heat sealing.

36. The method of claim 33 wherein the supply rolls are moved into tangential contact with the core along a linear path.

37. The method of claim 36 wherein the linear paths are disposed 180° from each other.

38. The method of claim 33 wherein the core is moved from the first position to the second position along a linear path of travel.

39. The method of claim 33 further comprising the steps of:
(a) inserting an end of an outer wrapper into the winding when the core is in the first position;
(b) winding a predetermined number of layers of wrappers around the wound core when it is in the second position after the plastic films have been severed;
(c) heat sealing the wrapper and severing it from a supply roll.

40. A method of winding a metallized plastic film capacitor comprising:
(a) attaching two metallized plastic films from two seaparate supply rolls to a first capacitor core in a first position in a staggered relationship and terminating said films beyond said core;
(b) rotating said first core in said first position for a predetermined number of revolutions to wind a predetermined number of layers of said two films under tension onto said first core;
(c) stopping said first core and bringing said two films under tension between said first core and said supply rolls;
(d) gripping said first core and moving said first core and films to a second position and maintaining said films under tension;
(e) leading a second capacitor core into said first position;
(f) attaching said two films to said second capacitor core in said first position in a staggered relationship and terminating said films beyond said second core; and
(g) winding said free ends of said films onto said first core.

41. The method of winding as claimed in claim 40 wherein:
attaching said two metallic metallized plastic films includes individually heat sealing each of said films separately to said cores.

42. A method of winding as claimed in claim 40 wherein:
one of said films is moved to a position on the other side of said first core position adjacent to the other one of said films prior to loading said second capacitor core into said first position.

43. The method of winding as claimed in claim 40 wherein:
one of said two films is attached to said second core and terminated after which said first core is again rotated several times to wind several more layers of ssaid second film onto said first core;
said second film is then attached to said second capacitor core in said first position and terminated between said second core and said first core and said first core is rotated again to wind said free end of said second film onto said first core; and
sealing said free ends of said films to said first wound core.

44. The method as claimed in claim 43 wherein:
said sealing of said free ends of said films to said first wound core includes sealing said last several layers of said second film onto itself.

45. The method as claimed in claim 43 wherein:
sealiing said last several layers of said second film to itself includes heat sealing the layers one to another.

46. The method as claimed in claim 40, wherein:
said core is moved from said first position to said second position along a substantially linear path.

47. An apparatus for winding at least one strip of metallized plastic film from a supply roll around a hollow core to form a metallized plastic film capacitor comprising:
(a) support means;
(b) core supply means attached to said support means;
(c) first coaxial rotatable spindle means attached to said support means to engage the core so as to rotate said core in a first position;
(d) second coaxial rotatable spindle means attached to said support means to engage the core so as to rotate said core in a second position;
(e) at least one film supply roll means attached to said support means;
(f) feed finger means to grip the core in the first position after the plastic film has been wound thereon and move it along a path to said second position;
(g) tension means to maintain a predetermined tension in the plastic film between the supply roll and the core during the travel of the core between said first and second positions;
(h) first attaching means to attach a portion of said at least one strip of plastic film to the core when it is in the first position;
(i) second attaching means to sever the at least one strip of plastic film from a wound core placed in the second position and attach it to a core placed in the first position; and
(j) selective drive means to rotate said first and second coaxial rotatable spindle means.

48. The apparatus claimed in claim 47 wherein said first coaxial rotatable spindle means are disposed along a linear path from said second coaxial rotatable spindle means.

49. The apparatus claimed in claim 47 wherein said feed finger means include:
a plurality of pairs of fingers, each finger having one end pivotably attached to support block means and having a general semicircular cut out adjacent their distal ends to grip the core;
spring means to bias the distal ends of the pairs of fingers toward each other, and
moving means to move said support block means such that said fingers grip said core in said first position and move it from said first position to said second position.

50. The apparatus as claimed in claim 47 wherein said first coaxial rotatable spindle means include:
first spindle assembly means; and
second spindle assembly means coaxially aligned with said first spindle assembly means.

51. The apparatus as claimed in claim 50 wherein said first spindle assembly means include:
(a) an outer spindle rotatably attached to said support means;
(b) an inner spindle mounted coaxially within said outer spindle so as to rotate therewith and so as to be movable with respect thereto along its longitudinal axis from an extended position to a retracted position and return; and
(c) means to selectively move said inner spindle between its extended and retracted positions.

52. The apparatus as claimed in claim 50 wherein said second coaxial rotatable spindle means include:
(a) third spindle assembly means; and
(b) fourth spindle assembly means coaxially aligned with said third spindle assembly means.

53. The apparatus as claimed in claim 52 wherein said third spindle assembly means includes:
(a) an outer spindle rotatable attached to said support means;
(b) an inner spindle mounted coaxially within said outer spindle so as to rotate therewith and so as to be movable with respect thereto along its longitudinal axis from an extended position to a retracted position and return; and
(c) means to selectively move said inner spindle between its extended and retracted positions.

54. The apparatus as claimed in clainm 52 further including:
spindle carriage slide means attached to said support means;
spindle carriage means slidably mounted on said spindle carriage slide means so as to move in a linear path parallel to the axis of said coaxial rotatable spindle means, said spindle carriage means having said second and fourth spindle assembly means rotatably attached thereto; and
means to move said spindle carriage means along its linear path of travel.

55. The apparatus as claimed in claim 54 wherein said fourth spindle assembly means include:
an outer spindle rotatably attached to said spindle carriage means;
an inner spindle mounted coaxially within said outer spindle so as to rotate therewith and so as to be movable with respect thereto along its longitudinal axis between an extended position and a retracted position and return; and
means to selectively move said inner spindle between its extended and retracted positions.

56. The apparatus as claimed in claim 54 wherein said second spindle assembly means include:
an inner spindle rotatably attached to the spindle carriage means, said inner spindle having an extending portion extending from said carriage in a direction along its longitudinal axis; and
an outer spindle fixedly attached to said carriage means and concentric with said extending portion.

57. The apparatus as claimed in claim 47 further including:
spindle carriage slide means attached to said support means;
spindle carriage means slidably mounted on said spindle carriage slide means so as to move in a linear path parallel to the axis of said coaxial rotatable spindle means; and
means to move said spindle carriage means along its linear path of travel.

58. The apparatus as claimed in claim 47 further including:
means for moving said film beyond said first position prior to severing said film from said wound core.

59. The apparatus as claimed in claim 47 further including:
spindle carriage means movable away from said support means to eject a wound core and movable back toward said support means to load a new core into said first position from said core supply means.

* * * * *